May 25, 1926.
G. A. JOHNSON
1,585,721
FRICTION SHOCK ABSORBING MECHANISM
Filed July 9, 1923
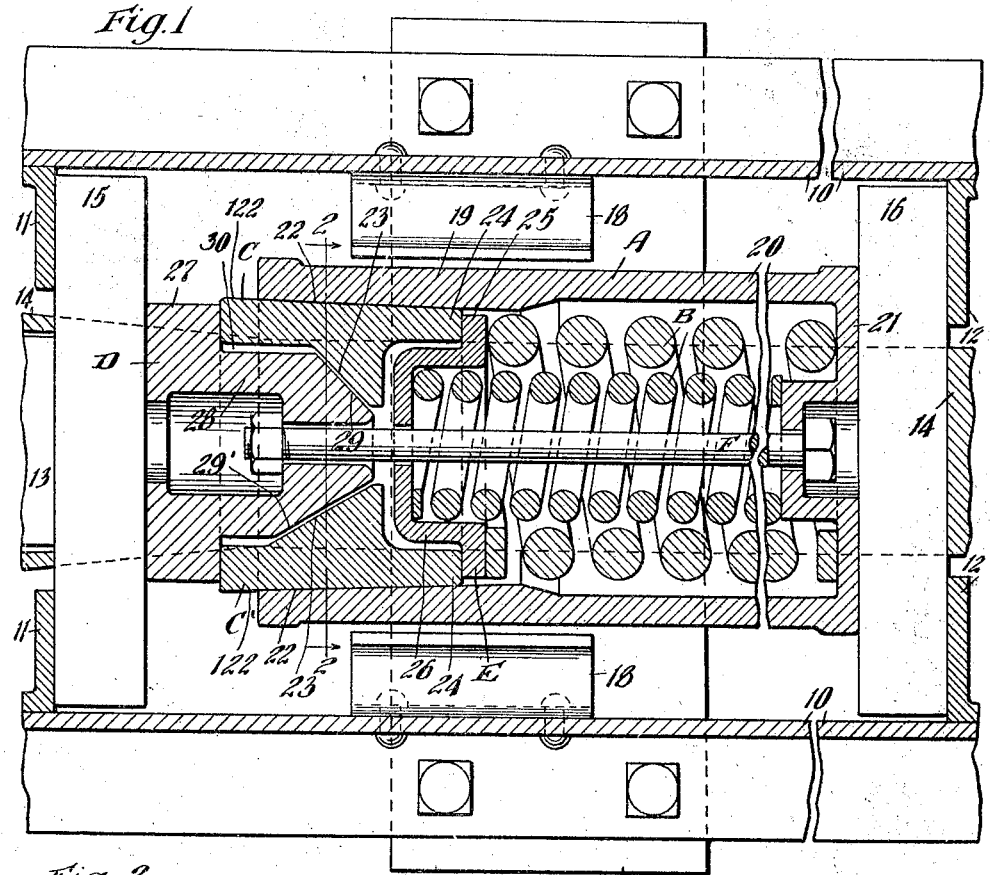
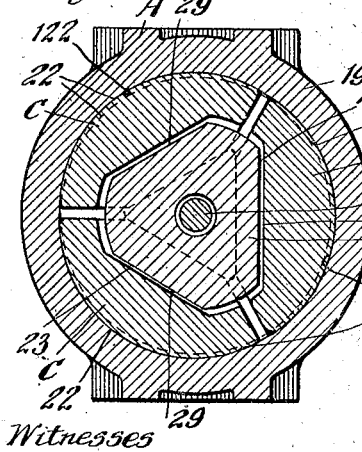
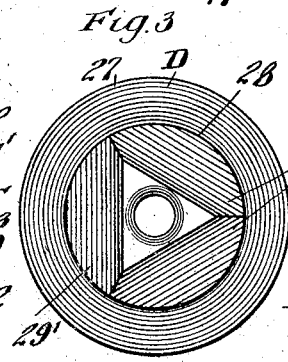
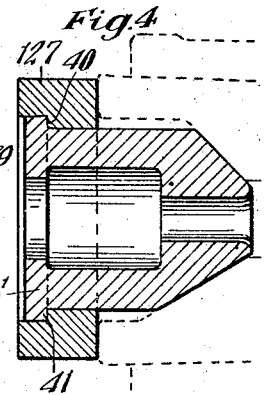
Witnesses
Wm. Geiger
Inventor
George A Johnson
By George I. Haight
His Atty.

Patented May 25, 1926.

1,585,721

UNITED STATES PATENT OFFICE.

GEORGE A. JOHNSON, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed July 9, 1923. Serial No. 650,216.

This invention relates to improvements in friction shock absorbing mechanisms.

One object of the invention is to provide a friction shock absorbing mechanism, especially adapted for railway draft riggings, wherein are obtained light resistance during initial or preliminary action and an automatic change into a heavier final friction resistance, during the compression stroke.

Another object of the invention is to provide, in a mechanism of the character indicated, a wedge system so arranged that, during the initial action and for a predetermined portion of the compression stroke, true wedge or spreading action is absent, with a gradual change in the condition of the system such that, as the friction elements enter a tapered friction shell, a true wedge or spreading action is set up in the wedge system and the frictional resistance thereby automatically increased.

Other objects of the invention will more clearly appear from the description and claims hereinafter following.

In the drawing forming a part of this specification, Figure 1 is a longitudinal sectional view of a portion of a railway draft rigging showing my improvements in connection therewith, the section through the friction elements corresponding to two intersecting planes at an angle of 120° to each other. Figure 2 is a vertical, transverse, sectional view of the shock absorbing mechanism proper and corresponding to the line 2—2 of Figure 1. Figure 3 is an inner end elevational view of the wedge element shown in Figures 1 and 2. And Figure 4 is a longitudinal sectional view of a modified form of wedge adapted to be employed with my improvements.

Referring first to the construction illustrated in Figures 1, 2 and 3, 10—10 denote the usual channel draft sills of the car underframe to the inner faces of which are secured front stop lugs 11 and rear stop lugs 12. A portion of a drawbar is indicated at 13, the same being operatively associated with a yoke 14 of well known form within which is disposed the shock absorbing mechanism proper, hereinafter described, and front and rear main followers 15 and 16. The yoke and parts therewithin are supported in operative position by a detachable saddle plate 17. As shown, the mechanism is of that type employing a substantially cylindrical shell and spring cage and in order to maintain the latter in central position, suitable guide plates 18—18 are secured to the inner faces of the draft sills as clearly indicated in Figure 8.

The improved shock absorbing mechanism proper, as shown, comprises, broadly, a combined friction shell and spring cage casting A; a spring resistance B; a pair of blunt angle wedge friction-shoes C—C; a keen angle wedge friction-shoe C'; a pressure-transmitting wedge D; a spring follower E; and a retainer bolt F.

The combined friction shell and spring cage casting A is of generally cylindrical form throughout its length with the friction shell proper 19 formed at the front or forward end and the spring cage proper 20 rearwardly thereof. The casting has an integral rear vertical wall 21 which abuts the rear follower 16. Preferably, the interior of the shell proper 19 is provided with a series of independent, cylindrical, friction surfaces 22—22, the same being converged inwardly of the shell and so disposed that, at their inner ends, the surfaces 22 will coalesce to complete a circle, as best indicated in Figure 2.

The three friction shoes C, C and C' (there being one shoe for each independent shell surface 22) are of like construction except as hereinafter pointed out, and each is formed with an outer, true, cylindrical friction surface 122 adapted to co-operate with the respective shell friction surface 22; and an inner wedge face 23. The faces 23 of the two shoes C extend at a relatively blunt angle with respect to the axis of the mechanism, whereas the face 23 of the shoe C' extends at a relatively keen angle thereto. At their inner ends 24, the friction shoes engage the laterally extended annular flange 25 formed on the cup-shaped spring follower E. Said annular flange is engaged on its opposite side by the outer heavy coil of the spring resistance B, the inner lighter coil of the spring resistance having its forward end seated within the cup-shaped section 26 of the spring follower E.

The wedge D, as shown, is in the form of a cast block, suitably cored, and having a heavy annular flange 27 at its outer end, bearing against the front follower 15 and so extended as to normally engage the outer ends of the three friction-shoes. Inwardly from the heavy flange section 27, the wedge D is provided with a projection 28, the inner end of which is formed with three wedge faces 29—29 and 29' arranged around the axis of the mechanism. The two wedge faces 29—29 are inclined to said axis at the same angle as the wedge faces 23 of the two blunt angle shoes C, whereas the wedge face 29' is inclined to correspond with the wedge face 23 of the shoe C'. In the normal or full release condition of the mechanism, as shown in Figure 1, all of the faces of the wedge will be out of contact with the shoe wedge faces 23, for the purpose hereinafter described. In Figure 1, this degree of clearance between the wedge faces is somewhat exaggerated when the scale of the drawing is considered, in order that the construction may be more clearly understood. It will also be noted that a clearance 30 is left around the projection 28 of the wedge D and the outer ends of the shoes C in order to provide for relative lateral movement between the shoes and the wedge, as hereinafter described.

The overall length of the mechanism is maintained by the retainer bolt F which is suitably anchored at its inner end within a hollow base formed integral with the casting A, and, at its forward end, within a cored recess of the wedge D. The retainer bolt F also serves to maintain the spring B under an initial compression.

Referring to Figure 1, the same illustrates the parts in a position assumed after assembling the mechanism, it being evident that the parts may assume slightly different positions after actuation of the mechanism, but the parts will at all times assume a position in full release, with no effective wedging action between the shoes and the wedge. For clearness, the operation of the mechanism will be described with reference to the position of the parts as shown in Figure 1.

With the parts in the normal condition as shown in said figure, it is evident that there will be no true wedging or spreading action from the wedge D to the shoes and consequently, as a compression stroke is initiated, the effective resistance is provided solely by the spring G with the addition of such slight friction as may be present between the shoes and the friction surfaces of the shell. At this time, it will be noted that the actuating pressure is applied directly from the wedge D to the outer ends of the shoes, and, as before stated, without any true wedging or spreading action. As the compression stroke continues, the friction shoes will be compelled to approach each other laterally as they travel down the tapered or inclined shell friction surface 22, and the condition will be reached where the shoe wedge faces 23 are brought into effective engagement with the wedge faces of the wedge D. At this stage of the compression stroke, it is evident that there will be an automatic change from the initial straight spring resistance (plus the slight frictional resistance as may occur between the shoes and shell) to an augmented frictional resistance induced by the spreading action from the wedge D to the friction shoes. As the compression stroke continues from this point on, the shoes will be made to approach each other still further and, automatically, the overall length of the wedge and shoe system will be increased and the outer ends of the friction-shoes withdrawn from contact with the heavy flange 27 of the wedge D. As will be evident to those skilled in the art, by properly proportioning the parts, the amount of preliminary easy spring action and the time of change from this action to the heavier wedge frictional action can be regulated as desired. Furthermore, the change from the easy action to the wedge friction action is not only accomplished automatically, but will be easy and gradual, thus avoiding sudden changes in the resistance of the mechanism to shocks. Due to the employment of the blunt and keen sets of wedge faces, I am enabled to obtain a very high wedging action during the latter part of the stroke, since the keen angle wedge faces may be made relatively acute without danger of the parts sticking, the blunt angle wedge faces acting more or less as "safety valves" to prevent sticking. I make no specific claim to this particular arrangement of blunt and keen wedge angle faces, inasmuch as the same constitutes the subject matter of certain other applications assigned to the assignee of this application. In this connection, it will be understood by those skilled in the art that my particular improvements are capable of use in a mechanism employing either the blunt and keen angle system of wedge faces or wedge faces which are all of the same angle with respect to the axis of the mechanism.

The arrangement shown is comparatively inexpensive to manufacture; simple, and comprises few parts. By providing for the easy preliminary action above described, the life of the mechanism is thereby greatly prolonged since the number of slight blows required to be absorbed by a shock absorbing mechanism in a draft rigging, far exceeds the number of heavy shocks to be absorbed and the easy cushioning action provided for the numerous small shocks minimizes the wear on the parts.

In the modified form of wedge shown in Figure 4, the heavy annular flange 127 is formed separate from the main section of the casting D', said flange 127 being in the form of an annular ring which is rabbeted as indicated at 40 and co-operates with a corresponding annular shoulder 41 provided on the cast section of the wedge D'. As shown in Figure 4, the front face of the flange 127 may project slightly beyond the front face of the wedge D', an amount corresponding to the clearance desired initially between the faces of the wedge and the wedge faces of the shoes so that a corresponding slight amount of relative longitudinal movement between the wedge D' and heavy flange 127 may take place without in any wise changing the action of the mechanism. With this construction, it is possible for the wedge D' to actually contact with the shoes during the initial part of the compression stroke but without, however, any true or effective wedging engagement with the shoes until the latter have moved within the friction shell and contracted radially sufficient to bring the outer face of the wedge D flush with the outer face of the heavy annular flange 127. From this point on, the action will be similar to that described for the form shown in Figures 1 to 3, inclusive.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction shell having interior opposed friction surfaces, the effective distance between which, at their outer ends, is greater than at their inner ends; of a spring resistance; a plurality of friction-shoes co-operable with said friction surfaces, said shoes directly receiving the actuating pressure during initial action of the mechanism and a predetermined portion of the compression stroke; and pressure transmitting wedge means, the latter being free from effective wedge-engagement with said shoes under full release and during said predetermined portion of the compression stroke and adapted to have co-operative wedge action with said shoes after said initial action as the compression stroke of the mechanism progresses beyond said predetermined portion of the stroke.

2. In a friction shock absorbing mechanism, the combination with a friction shell having interior opposed friction surfaces, the effective distance between which, at their outer ends, is greater than at their inner ends; of a spring resistance; a plurality of friction-shoes co-operable with said friction surfaces; pressure-transmitting means co-operable with said shoes at the initial part of the compression stroke; and wedge means, normally free from co-operative wedge action with said shoes, but adapted to have co-operative wedge action with said shoes as the compression stroke takes place.

3. In a friction shock absorbing mechanism, the combination with a friction shell having interior opposed friction surfaces; of a spring resistance; a plurality of friction shoes co-operable with said friction surfaces; means for transmitting the actuating pressure direct to said shoes at the beginning of the compression stroke while permitting lateral approach of said shoes; and wedge means co-operable with said shoes initially free from co-operating wedging action with the shoes, said shell surfaces being converged inwardly of the mechanism, thereby effecting relative lateral approach of the shoes and wedge during the progress of a compression stroke to bring the wedge and shoes into true effective wedging engagement.

4. In a friction shock absorbing mechanism, the combination with a member having a plurality of longitudinally extending friction surfaces, the said friction surfaces being converged in a direction lengthwise of said member; of a spring resistance; a plurality of friction-shoes co-operable with the said friction surfaces of said member; and pressure-transmitting wedge means co-operable with said shoes, said means being free from effective wedge engagement with said shoes when the mechanism is in full release, said wedge means automatically effecting co-operative engagement with said shoes during the compression stroke of the mechanism.

5. In a friction shock absorbing mechanism, the combination with a member having longitudinally extending friction surfaces converged in a direction lengthwise of said member; of a spring resistance; a plurality of wedge-friction-shoes frictionally co-operable with said surfaces and adapted to be yieldingly resisted by said spring; means for transferring the actuating pressure direct to said shoes in a direction lengthwise of said member at the beginning of the compression stroke; and wedge means co-operable with said shoes after a predetermined amount of the compression stroke of the mechanism, the converged formation of said friction surfaces of said member automatically inducing a change from said direct application of the actuating force to said shoes to an application of the actuating force through said wedge means during the compression stroke.

6. In a friction shock absorbing mechanism, the combination with a friction shell having interior friction surfaces converged inwardly of the shell; of a spring resistance; a plurality of friction-shoes co-operable with the friction surfaces of said shell; and a wedge, said wedge having a portion thereof normally engaging the outer ends of the shoes when the mechanism is in full release, said wedge having also a plurality of wedge faces adapted to co-operate with corresponding wedge faces on the shoes, said sets of wedge faces being free from effective wedge-engagement when the mechanism is in full release but adapted to have co-operative engagement as the shoes travel inwardly of the converged friction surfaces.

7. In a friction shock absorbing mechanism, the combination with a friction shell having a plurality of independent, cylindric, interior friction surfaces converged inwardly of the shell; of a spring resistance; a plurality of friction-shoes each having an outer cylindric friction surface and an inner wedge face; a spring follower interposed between the inner ends of said shoes and the adjacent end of the spring resistance; and a pressure-transmitting wedge, the latter having an outer annular flange normally engaging the outer ends of the friction-shoes and a plurality of wedge faces normally out of effective engagement with the wedge faces of the shoes, said sets of wedge faces automatically becoming effectively engaged as the shoes and wedge travel inwardly of the shell, the outer ends of the friction-shoes simultaneously being withdrawn from engagement with the flange of said wedge.

8. In a spring friction shock absorbing mechanism, the combination with a member having friction surfaces; a spring resistance; friction elements adapted to frictionally co-operate with said friction member during a portion of the compression stroke; wedging means adapted to co-operate with said friction elements, during a portion of the compression stroke, to effect true frictional co-operation between said elements and member; and means for transmitting the actuating force through said elements to the spring resistance, with said elements acting as pressure-transmitting members and substantially free from frictional co-operation with said member during a portion of the compression stroke; and means for effecting an automatic transference of the actuating pressure to said wedging means and thence through said friction elements during another portion of the compression stroke of the mechanism.

9. In a friction shock absorbing mechanism, the combination with a friction member having friction surfaces inclined with respect to the line of compression of the mechanism; a spring resistance; friction elements adapted to frictionally co-operate with said member during a portion of the compression stroke of the mechanism and adapted, during said portion of the compression stroke, to transmit the actuating force substantially directly to the spring resistance; and wedging means, substantially ineffective as such during said portion of the compression stroke with respect to said friction elements, said wedging means being rendered co-operatively effective with said friction elements during another portion of the compression stroke and then adapted to receive the actuating force, the actuating force being transmitted from said wedging means to and through said friction elements.

In witness that I claim the foregoing I have hereunto subscribed my name this 5th day of July 1923.

GEORGE A. JOHNSON.